(12) United States Patent
Sakagami

(10) Patent No.: US 8,738,936 B2
(45) Date of Patent: May 27, 2014

(54) STORAGE APPARATUS

(75) Inventor: Yuichi Sakagami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 500 days.

(21) Appl. No.: 12/790,983

(22) Filed: May 31, 2010

(65) Prior Publication Data

US 2010/0325461 A1  Dec. 23, 2010

(30) Foreign Application Priority Data

Jun. 18, 2009  (JP) ................................ 2009-145679

(51) Int. Cl.
*G06F 1/32* (2006.01)
*G06F 1/26* (2006.01)
*G06F 3/06* (2006.01)

(52) U.S. Cl.
CPC ............ *G06F 1/3203* (2013.01); *G06F 1/3209* (2013.01); *G06F 1/3268* (2013.01); *G06F 3/0625* (2013.01); *Y02B 60/1246* (2013.01)
USPC ......................................... 713/300; 713/324

(58) Field of Classification Search
CPC ... G06F 1/3203; G06F 1/3209; G06F 1/3268; G06F 3/0625; Y02B 60/1246
USPC ................................ 713/300, 324
See application file for complete search history.

(56) References Cited

U.S. PATENT DOCUMENTS

| | | | |
|---|---|---|---|
| 7,546,478 B2 | 6/2009 | Kubo et al. | |
| 7,573,715 B2 * | 8/2009 | Mojaver et al. | 361/716 |
| 7,639,493 B2 * | 12/2009 | Hori et al. | 361/679.4 |
| 7,953,904 B2 * | 5/2011 | Hemmi et al. | 710/20 |
| 8,001,393 B2 * | 8/2011 | Hori et al. | 713/300 |
| 8,015,420 B2 * | 9/2011 | Cherian et al. | 713/320 |
| 2003/0093721 A1 * | 5/2003 | King et al. | 714/42 |
| 2004/0068672 A1 * | 4/2004 | Fisk et al. | 713/323 |
| 2007/0192637 A1 * | 8/2007 | Kubo et al. | 713/300 |
| 2008/0030945 A1 * | 2/2008 | Mojaver et al. | 361/685 |
| 2008/0140836 A1 | 6/2008 | Miyawaki et al. | |
| 2009/0119530 A1 * | 5/2009 | Fisk et al. | 713/324 |
| 2009/0132838 A1 * | 5/2009 | Cherian et al. | 713/320 |
| 2009/0271640 A1 | 10/2009 | Sakagami et al. | |

FOREIGN PATENT DOCUMENTS

| | | | |
|---|---|---|---|
| JP | 2003-158529 A | 5/2003 | |
| JP | 2004-362282 A | 12/2004 | |
| JP | 2007-213584 A | 8/2007 | |

(Continued)

OTHER PUBLICATIONS

Japanese Office Action mailed May 24, 2011 for corresponding Japanese Application No. 2009-145679, with English-language Translation.

(Continued)

*Primary Examiner* — M Elamin
(74) *Attorney, Agent, or Firm* — Fujitsu Patent Center

(57) ABSTRACT

A storage apparatus connectable to an external apparatus through a connection line for data communication includes: a storage for storing data; a system controller for controlling data communication with the external apparatus through the connection line so as to allow the external apparatus to access the storage; and a power controller for controlling power supply to the storage, wherein the system controller controls the power controller to initiate supply of a power to the storage after establishing a communication linkage with the external apparatus through the connection line.

8 Claims, 10 Drawing Sheets

(56) References Cited

FOREIGN PATENT DOCUMENTS

| JP | 2008-123493 A | 5/2008 |
|---|---|---|
| JP | 2008-152316 A | 7/2008 |
| JP | 2008-203957 A | 9/2008 |
| JP | 2009-266017 A | 11/2009 |
| WO | WO-2009/034640 A1 | 3/2009 |

OTHER PUBLICATIONS

Japanese Office Action mailed Mar. 6, 2012 for corresponding Japanese Application No. 2009-145679, with Partial English-language Translation.

* cited by examiner

STORAGE APPARATUS

CROSS-REFERENCE TO RELATED APPLICATION

This application is based upon and claims the benefit of priority of the prior Japanese Patent Application No. 2009-145679 filed on Jun. 18, 2009, the entire contents of which are incorporated herein by reference.

FIELD

The embodiments discussed herein are related to a storage apparatus.

BACKGROUND

There has been used a large-capacity storage system including a plurality of connected disk enclosures in each of which a plurality of storages, such as disks, are received. The disk enclosure is one of a storage apparatus. In addition, various techniques of reducing the power consumption of such a storage system have been proposed because operating all of storages included in the storage system at all times entails higher power cost.

For example, according to an existing technique, a Serial Attached SCSI (SAS) repeater chip is mounted on a storage system, an higher-level control apparatus connected to the storage system controls power supply to storages received in each disk enclosure using an out-of-band (OOB) sequence, thus reducing the power consumption of the storage system. Recently, there has been proposed a storage system that is mounted with no SAS repeater chip in order to support SAS 1.1 or SAS 2.0.

In recent years, however, storage systems are expected to reduce the power consumption by performing power supply control without using repeater chips.

SUMMARY

According to an aspect of the embodiment, a storage apparatus connectable to an external apparatus through a connection line for data communication, comprising: a storage for storing data; a system controller for controlling data communication with the external apparatus through the connection line so as to allow the external apparatus to access the storage; and a power controller for controlling power supply to the storage, wherein the system controller controls the power controller to initiate supply of a power to the storage after establishing a communication linkage with the external apparatus through the connection line.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment of a controller disclosed in the present application will be described in detail below with reference to the drawings. The present invention is not limited by the embodiment.

Figure 1:
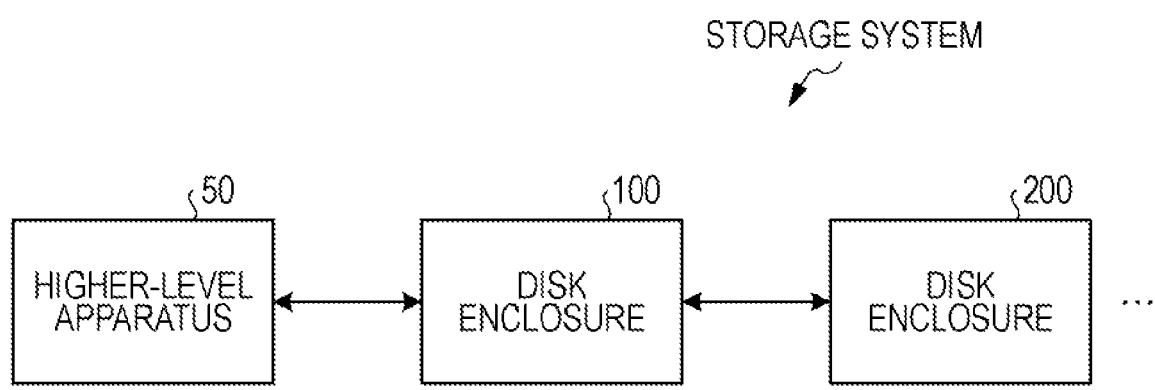
FIG. 1 is a diagram illustrating the configuration of a storage system in an embodiment.

FIG. 1 illustrates the configuration of a storage system in the present embodiment. Referring to FIG. 1, this storage system includes a higher-level apparatus 50 and disk enclosures 100 and 200. The higher-level apparatus 50 and disk enclosure 200 are external apparatuses, respectively. The higher-level apparatus 50 and the disk enclosure 100 are connected through Serial Attached SCSI (SAS). The disk enclosures 100 and 200 are connected through SAS. For convenience of explanation, the disk enclosures 100 and 200 are illustrated in FIG. 1. The storage system in the present embodiment includes another disk enclosure.

The higher-level apparatus 50 accesses storages received in the disk enclosures 100 and 200 to write and/or read data. Each of the disk enclosures 100 and 200 receives a plurality of storages. In addition, each of the disk enclosures 100 and 200 determines the status of communication with the higher-level apparatus 50, for example, a link status and controls power supply to the storages received in the enclosure.

As described above, since each of the disk enclosures 100 and 200 in the present embodiment controls power supply to the storages by itself, the disk enclosures 100 and 200 can save power without depending on a mechanism in the storage system and/or a communication method of the higher-level apparatus.

Figure 2:
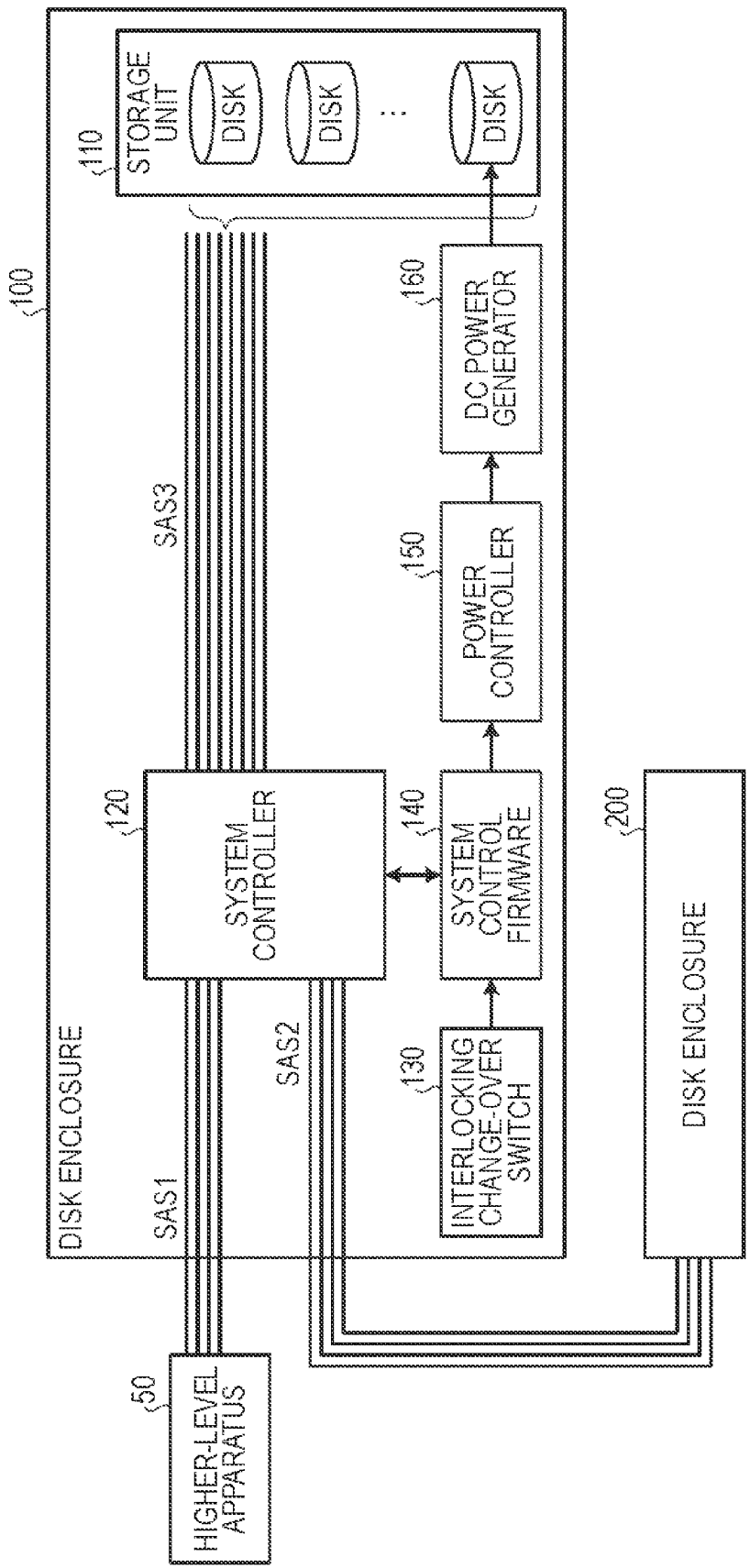
FIG. 2 is a diagram illustrating the schematic configuration of a disk enclosure in the embodiment.

The schematic configuration of the disk enclosure 100 illustrated in FIG. 1 will now be described. FIG. 2 illustrates the schematic configuration of the disk enclosure 100 in the present embodiment. Referring to FIG. 2, the disk enclosure 100 includes a storage unit 110 holding a plurality of disks, a system controller 120, an interlocking change-over switch 130, a system control firmware 140, a power controller 150, and a DC power generator 160.

The disk enclosure 100 is connectable to the other external apparatus through a connection line for data communication. The storage unit 110 stores data. The system controller 120 controls data communication with the external apparatus through the connection line so as to allow the external apparatus to access the storage unit 110. The power controller controls power supply to the storage unit 110. The system controller controls the power controller to initiate supply of a power to the storage unit 110 after establishing a communication linkage with the external apparatus through the connection line.

The system controller (SAS expander) 120 controls data communication between the higher-level apparatus 50, the storage unit 110, and the disk enclosure 200. The system controller 120 establishes the communication linkage in accordance with a result of communication with the external apparatus, such as the higher-level apparatus 50. As illustrated in FIG. 2, the higher-level apparatus 50 and the system controller 120 are connected through, for example, four signal lines of SAS connection. The system controller 120 and the storage unit 110 through, for example, eight signal lines of SAS connection. In addition, the system controller 120 and the disk enclosure 200 are connected through, for example, four signal lines of SAS connection. Thus, the disk enclosure 100 can supply the power to the storage unit 110 in accordance with the result of communication with the external apparatus, such as the higher-level apparatus 50.

The interface between the higher-level apparatus 50 and the system controller 120 is expressed as "SAS1". The interface between the system controller 120 and the disk enclosure 200 is expressed as "SAS2". The interface between the system controller 120 and the storage unit 110 is expressed as "SAS3".

In addition to the above-described process, the system controller 120 controls opening/closing ports of SAS1, SAS2, and SAS3 in response to a control command acquired from the system control firmware 140. The external apparatus, such as the higher-level apparatus 50 can access to the system controller 120 while the port opens. The external apparatus, such as the higher-level apparatus 50 can not access to the system controller 120 while the port closes.

The interlocking change-over switch 130 holds information indicating whether power supply control is performed by the disk enclosure 100 and outputs a signal based on the held information to the system control firmware 140.

In the case where the interlocking change-over switch 130 holds information indicating that power supply control is performed by the disk enclosure 100, the interlocking change-over switch 130 outputs a signal based on the information to the system control firmware 140. Note that if power supply control is not performed by the disk enclosure 100, the interlocking change-over switch 130 does not output any signal.

The system control firmware 140 is a processing unit that determines the status of communication between the higher-level apparatus 50 and the system controller 120 and performs power supply control for the storage unit 110 in accordance with the result of judgment and the signal supplied from the interlocking change-over switch 130. The system control firmware 140 outputs a control command to instruct opening/closing the ports to the system controller 120 in accordance with the result of judgment.

The power controller 150 controls the DC power generator 160 to supply power to, or power on the storage unit 110 when receiving a power-on instruction from the system control firmware 140. The DC power generator 160 adjusts a level of voltage output from a device power supply (not illustrated) in response to a control command from the power controller 150 and outputs the adjusted voltage to the storage unit 110.

Processes performed by the disk enclosure 100 will be concretely described below. A process related to a power-on co-operating mechanism will be described first. After that, a process related to a power-off co-operating mechanism will be described. In standby mode, the higher-level apparatus 50, the system controller 120, the interlocking change-over switch 130, the system control firmware 140, and the power controller 150 are running. On the other hand, each disk in the storage unit 110 is not supplied with power and is not running. Standby mode is defined as the status of the system controller 120 waiting for request of connection from the external apparatus, such as the higher-level apparatus 50. The system controller 120 opens a port to connect the higher-level apparatus 50 through the connection line while waiting request of connection from the higher-level apparatus 50.

Figure 3:
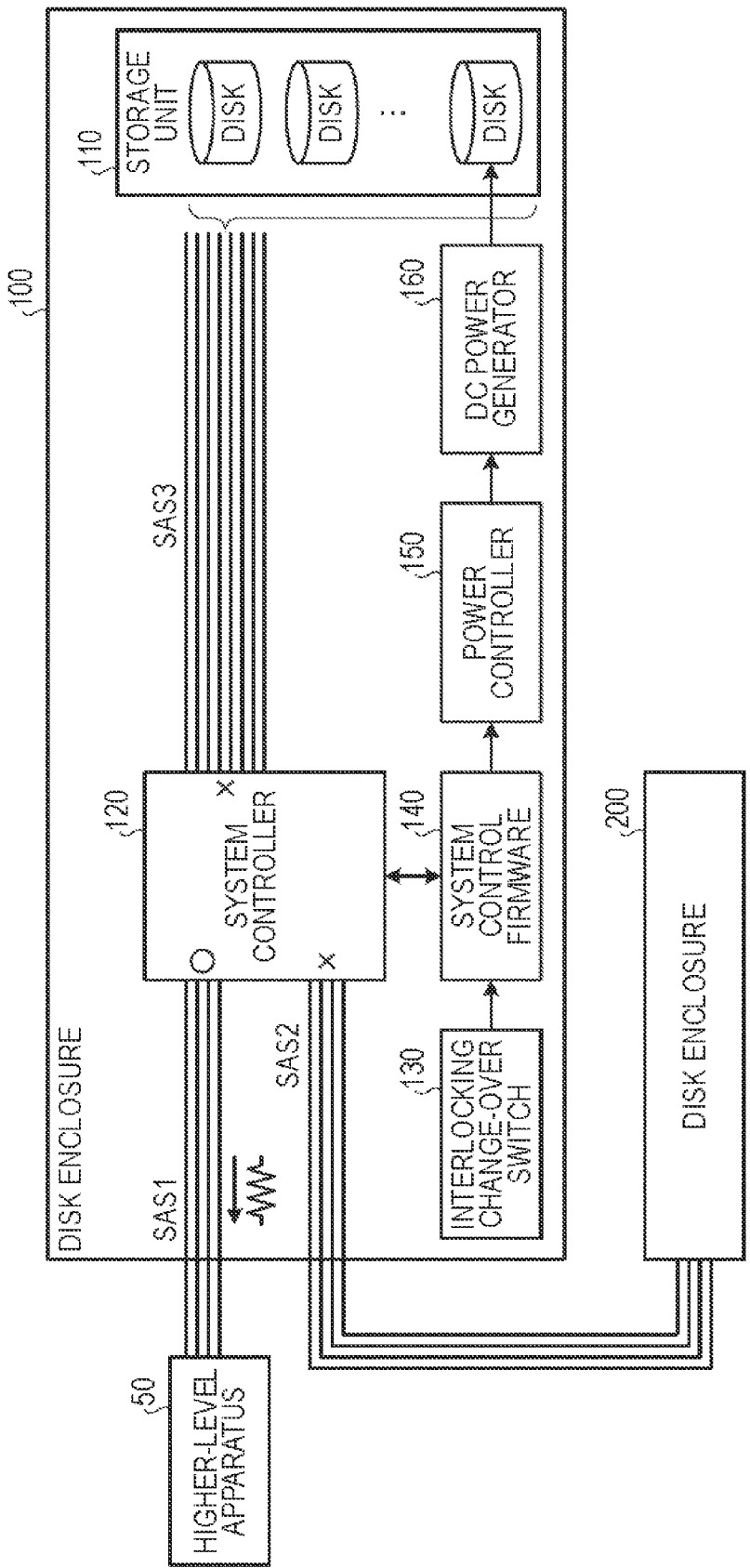
FIG. 3 is a diagram explaining a process related to a power-on co-operating mechanism.
Figure 4:
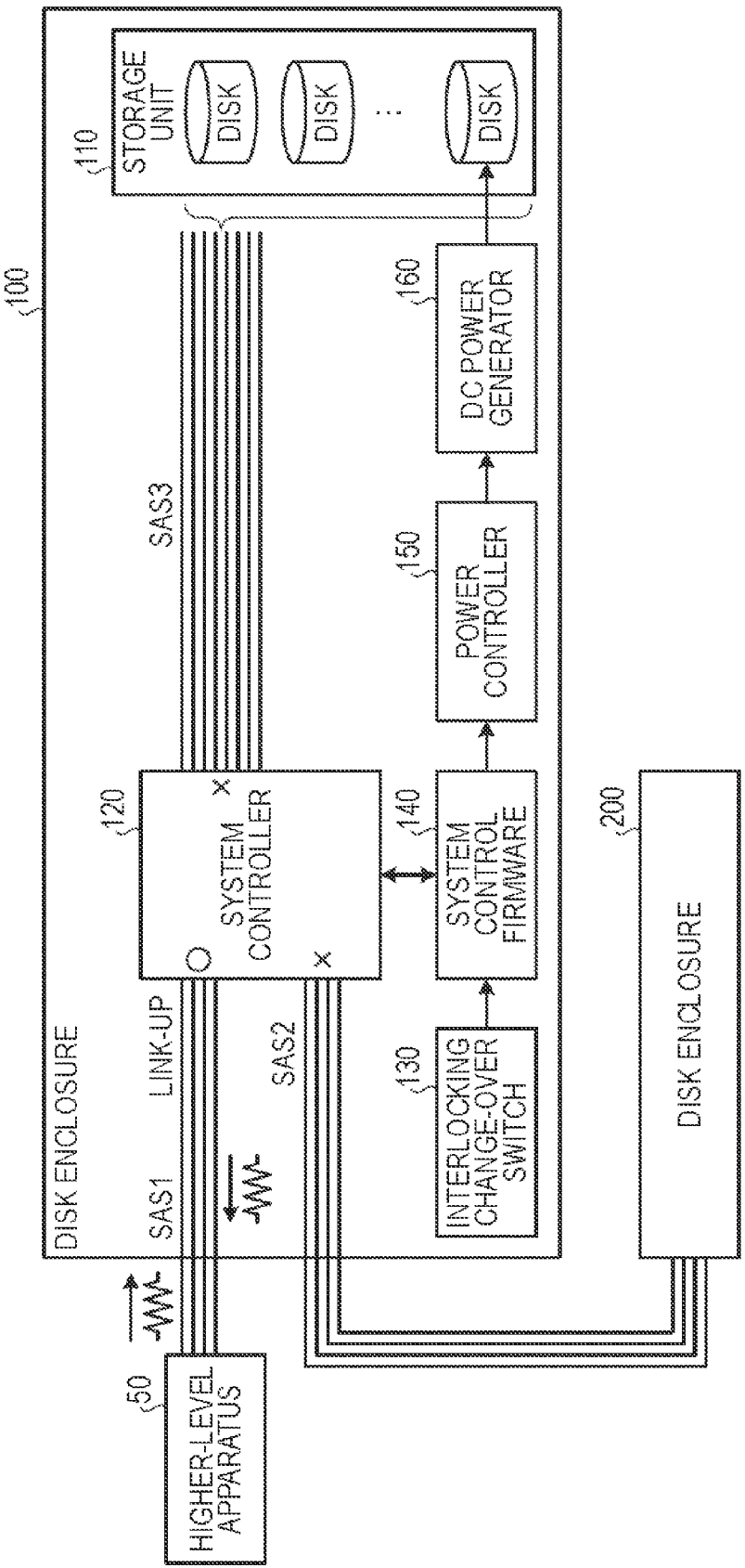
FIG. 4 is a diagram explaining the process related to the power-on co-operating mechanism.
Figure 5:
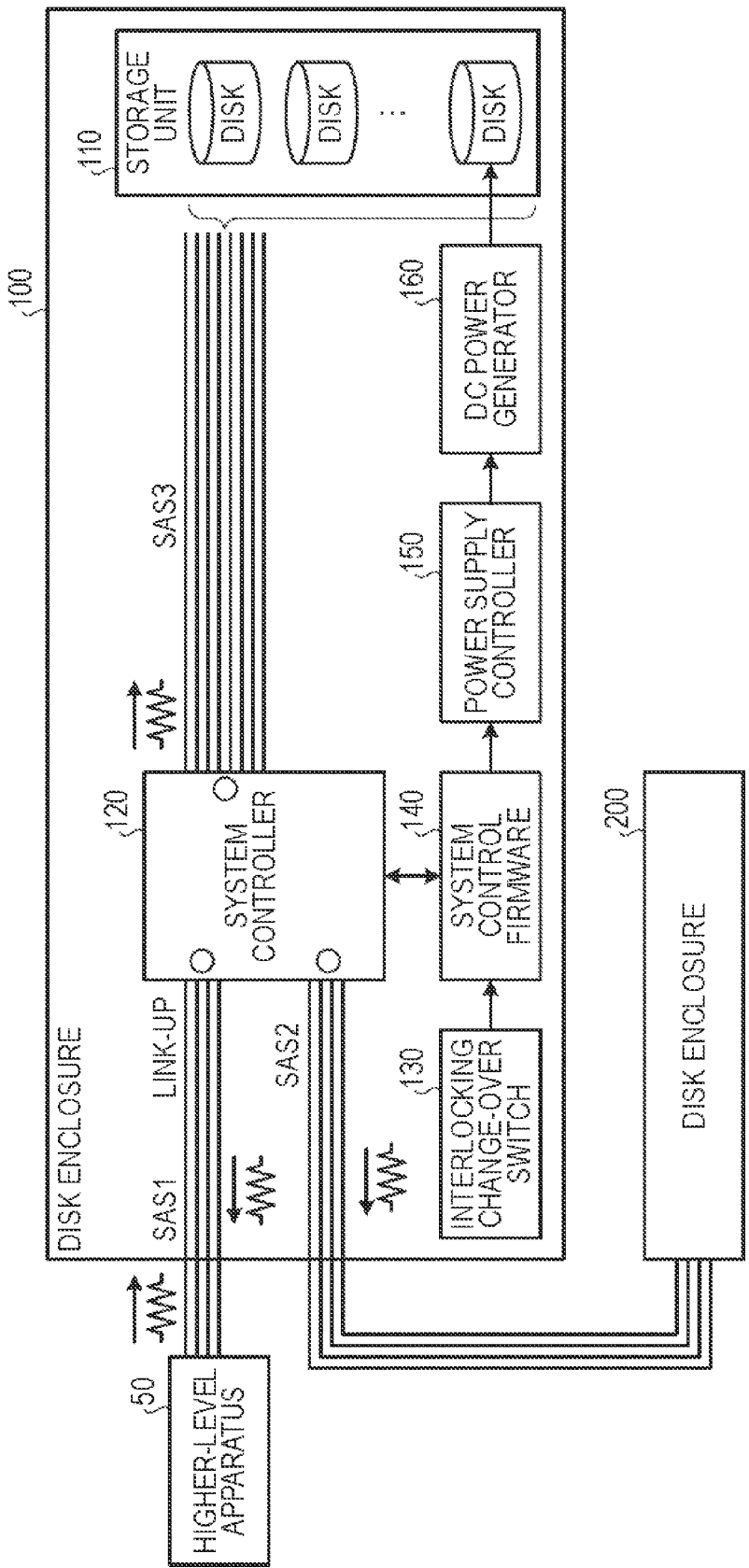
FIG. 5 is a diagram explaining the process related to the power-on co-operating mechanism.

FIGS. 3 to 5 are diagrams explaining the process related to the power-on co-operating mechanism. First, explanation will be made with reference to FIG. 3. In the standby mode, the system controller 120 opens the ports of SAS1 and closes the ports of SAS2 and SAS3. The system controller 120 periodically transmits link-up information to the higher-level apparatus 50.

Explanation will be made with reference to FIG. 4. When the higher-level apparatus 50 is activated, a COMINIT signal is transmitted from the higher-level apparatus 50 to the system controller 120, so that a link-up sequence is started in SAS1. Link-up status is the status of the system controller 120 establishing a communication linkage with the other system controller of an external apparatus, such as the higher-level apparatus 50.

The system control firmware 140 monitors SAS1 and determines whether the link-up of a predetermined number or more of signal lines of the signal lines of SAS1 has been completed. So long as the link-up of the predetermined number or more of the signal lines has been completed and the system control firmware 140 receives a signal from the interlocking change-over switch 130, the system control firmware 140 transmits a power-on instruction for the storage unit 110 to the power controller 150. When receiving the power-on instruction, the power controller 150 controls the DC power generator 160 to power on the storage unit 110.

Explanation will be further made with reference to FIG. 5. The system controller 120 has a plurality of ports and when the system controller 120 establishes the communication linkage with the external apparatus in one of the ports, such as the higher-level apparatus 50, the system controller opens the other ports. Before the system control firmware 140 confirms that the power controller 150 controls the DC power generator 160 to start powering on, the system control firmware 140 outputs a control command to the system controller 120 to open the ports of SAS2. After the system control firmware 140 confirms that the power controller 150 controls the DC power generator 160 to start powering on, the system control firmware 140 outputs a control command to the system controller 120 to open the ports of SAS3. Opening the ports of SAS3 before starting powering on the DC power generator, the system controller 120 can boot up the lower-level apparatus such as the disk enclosure 200 quickly.

When the ports of SAS2 and SAS3 are opened, the higher-level apparatus 50 can access the storage unit 110 and the disk enclosure 200. Thus, the disk enclosure 100 can open the ports to lower-level apparatus, such as the disk enclosure 200 after the disk enclosure 100 has correctly communicated with the external apparatus, such as the higher-level apparatus 50.

When the higher-level apparatus 50 can access the disk enclosure 200, the higher-level apparatus 50 transmits a COMINIT signal to the disk enclosure 200. The transmission of the COMINIT signal to the disk enclosure 200 starts a sequence of link-up between the higher-level apparatus 50 and the disk enclosure 200. The disk enclosure 200 starts powering on the storage unit 110 in a manner similar to the disk enclosure 100.

As described above, since the disk enclosure 100 starts the sequence of link-up between the disk enclosure 200 after establishing the sequence of link-up between the higher-level apparatus 50, the disk enclosure 100 can establish the sequence of link-up between the disk enclosure 200 correctly.

Figure 6:
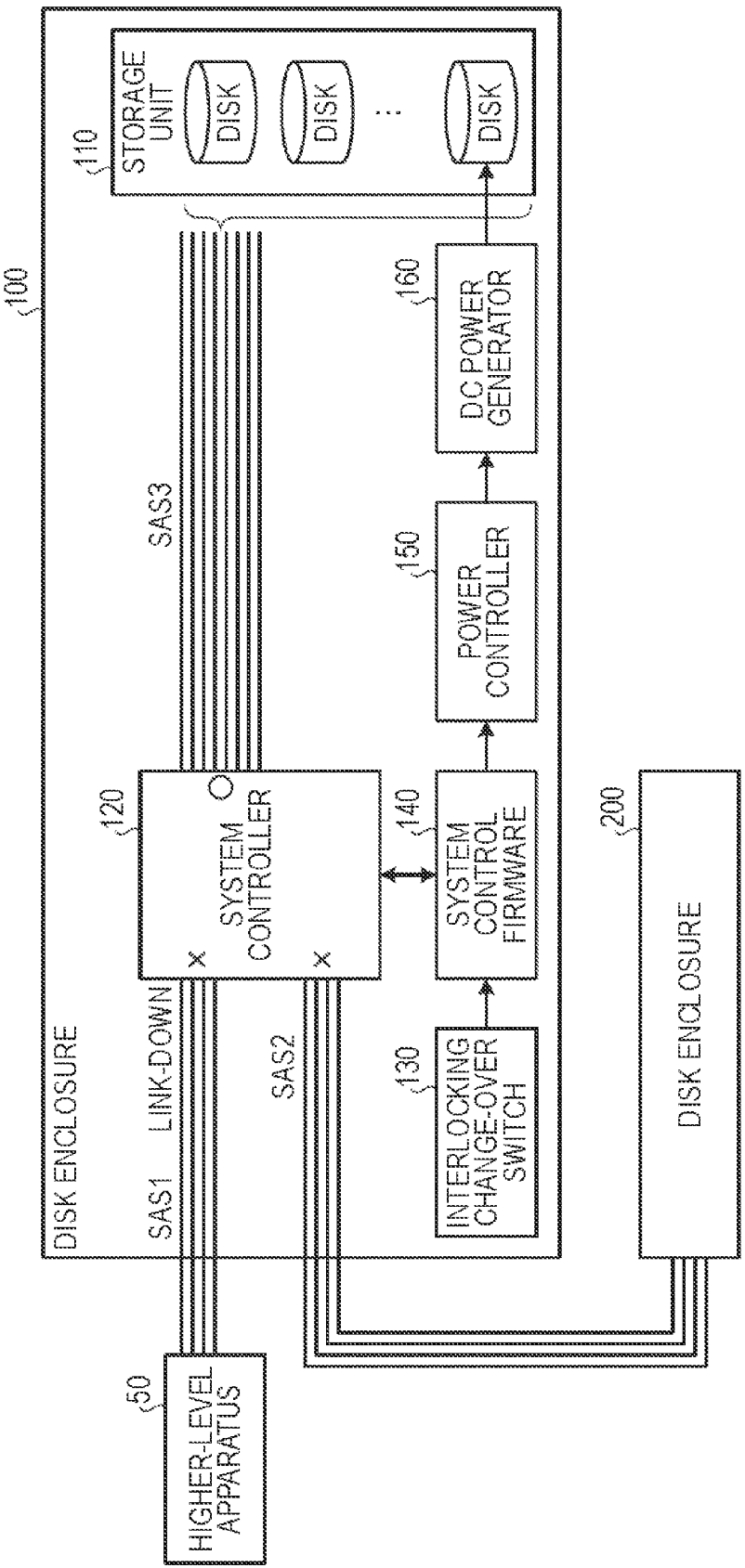
FIG. 6 is a diagram explaining a process related to a power-off co-operating mechanism.
Figure 7:
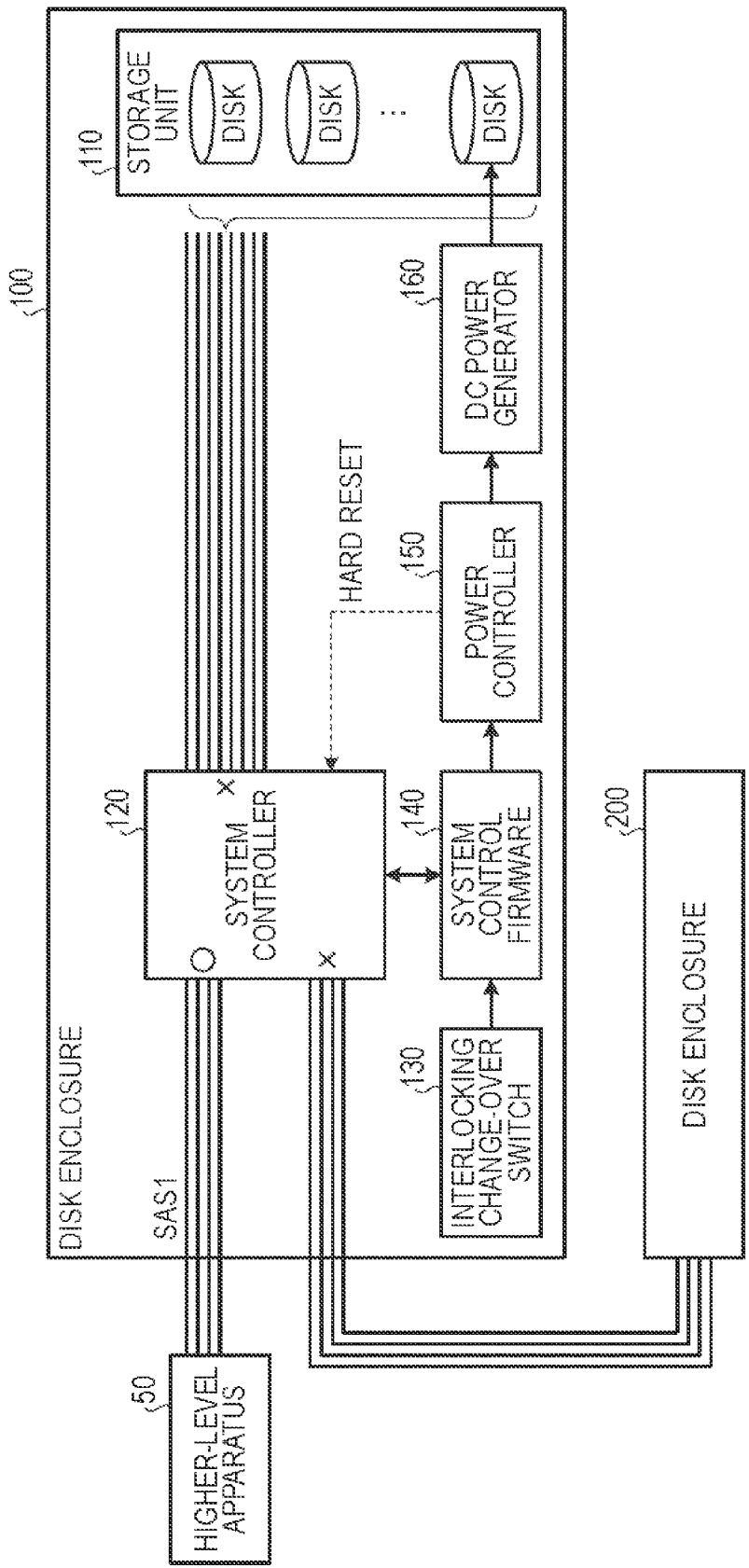
FIG. 7 is a diagram explaining the process related to the power-off co-operating mechanism.

The process related to the power-off co-operating mechanism will now be described. FIGS. 6 and 7 are diagrams explaining the process related to the power-off co-operating mechanism. Explanation will be made with reference to FIG. 6. The system control firmware 140 monitors SAS1 and determines whether all of the signal lines of SAS1 have entered a link-down status. The link-down status is the status of system controller 120 releasing the communication linkage with the other system controller of an external apparatus, such as the higher-level apparatus 50.

So long as all of the signal lines have entered the link-down status, the system control firmware 140 outputs a control command to the system controller 120, thus closing the ports of SAS2. Early closing the ports of SAS2 can reduce the time required to power off each of the apparatuses (the disk enclosure 200 and the like) placed downstream of and connected to the disk enclosure 100.

The system controller 120 controls the power controller 150 to stop supply of a power to the storage unit 110 after releasing all of communication linkages. If all of the signal lines have entered the link-down status, the system control firmware 140 outputs a power-off instruction for the storage unit 110 to the power controller 150. Internal processing, such as backup of an internal log and disk spin-down, is performed during a period between the time when the power-off instruction is given to the power controller 150 and the time when the storage unit 110 is actually powered off. After completion of the internal processing, the power controller 150 controls the DC power generator 160 to power off, or stop power supply to the storage unit 110. Thus, the disk enclosure 100 can supply power to the storage unit 110 in accordance with the necessity of the communication with the external apparatuses.

Explanation will now be made with reference to FIG. 7. After power-off of the storage unit 110, the power controller 150 outputs a HARD RESET signal to the system controller 120. When the system controller 120 receives the HARD RESET signal from the power controller 150, the device 120 is initialized and the ports of SAS1 are opened.

According to the process related to the power-off co-operating mechanism explained with reference to FIGS. 6 and 7, in the case where all of the signal lines have entered the link-down status, the storage unit 110 is powered off. A way of powering off is not limited to this case. For example, so long as the system control firmware 140 previously acquires information for permitting to stop supply of the power to the storage unit 110 from the external apparatus, such as the higher-level apparatus 50, the storage unit 110 may be powered off after the system controller releases all of communication linkages. The reliability of the electrical power control can be improved by setting the information for permitting to stop supply of the power to the storage unit 110.

Figure 8:
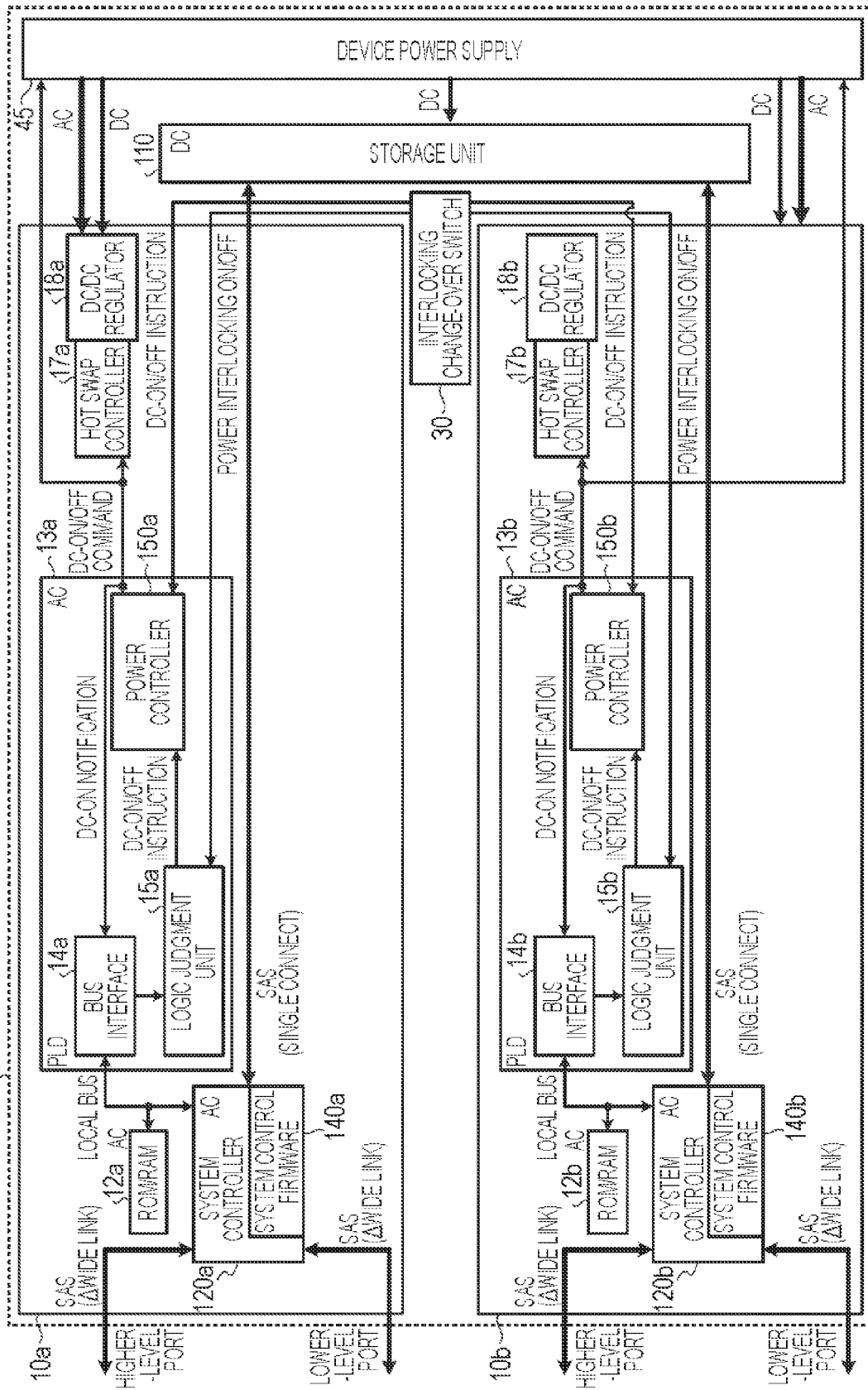
FIG. 8 is a diagram illustrating the configurations of disk enclosures in the embodiment.

The configurations of the disk enclosures 100 and 200 in the present embodiment will now be described. FIG. 8 illustrates the configurations of the disk enclosure in the present embodiment. Although FIG. 8 illustrates only the disk enclosure 100, the arrangement of disk enclosures is not limited to this case.

Referring to FIG. 8, the disk enclosure 100 includes board 10a and 10b, an interlocking change-over switch 30, a storage unit 40, and a device power supply 45. Each of the board 10a and 10b has the same structure so as to be redundant. Each of the board 10a and 10b is connected to an interlocking change-over switch 30, a storage unit 40, and a device power supply 45, respectively.

The board 10a includes a system controller 120a, a system control firmware 140a, a read-only memory and random access memory (ROM/RAM) 12a storing various pieces of information, a programmable logic device (PLD) 13a, a hot swap controller 17a, and a DC/DC regulator 18a. The PLD 13a includes a bus interface 14a, a logic judgment module 15a, and a power controller 150a. The system controller 120a, the system control firmware 140a, the ROM/RAM 12a, and the PLD 13a are driven by resident power (AC).

The board 10b includes a system controller 120b, a system control firmware 140b, a read-only memory and random access memory (ROM/RAM) 12b storing various pieces of information, a programmable logic device (PLD) 13b, a hot swap controller 17b, and a DC/DC regulator 18b. The PLD 13b includes a bus interface 14b, a logic judgment module 15b, and a power controller 150b. The system controller 120b, the system control firmware 140b, the ROM/RAM 12b, and the PLD 13b are driven by resident power (AC). The board 10b has the same components, so the detailed description of the board 10b will be omitted.

The system controller 120a corresponds to the system controller 120 illustrated in FIG. 2. The system controller 120a controls data communication between the higher-level apparatus 50 connected to higher-level ports, the storage unit 110, and the disk enclosure 200 connected to lower-level ports.

The system control firmware 140a corresponds to the system control firmware 140 illustrated in FIG. 2. The system control firmware 140a determines the status of communication between the higher-level apparatus 50 and the system controller 120a and outputs information for power supply control to the PLD 13a in accordance with the result of judgment.

Specifically, the system control firmware 140a monitors the SAS for the higher-level apparatus 50. When the link-up of a predetermined number or more of signal lines of the signal lines of the SAS is completed, the system control firmware 140a outputs a power-on instruction for the storage unit 110 to the PLD 13a.

In addition, the system control firmware 140a monitors the SAS for the higher-level apparatus 50 and, if all of the signal lines have entered the link-down status, outputs a power-off instruction for the storage unit 110 to the PLD 13a.

The bus interface 14a transmits information output from the system control firmware 140a to the logic judgment module 15a. In addition, the bus interface 14a outputs information, which is output from the power controller 150a, indicating power-on of the storage unit 110 to the system controller 120a and the system control firmware 140a.

When receiving a power-on instruction from the system control firmware 140a while acquiring information indicating that power-on is permitted from the interlocking change-over switch 30, the logic judgment module 15a outputs the power-on instruction to the power controller 150a.

In addition, when receiving a power-off instruction from the system control firmware 140a while acquiring information indicating that power-off is permitted from the interlocking change-over switch 30, the logic judgment module 15a outputs the power-off instruction to the power controller 150a.

The power controller 150a outputs a command to power on or off the storage unit 110 to the hot swap controller 17a and the device power supply 160 on the basis of an instruction acquired from the logic judgment module 15a. In addition, when receiving a power-on instruction or a power-off instruction from the interlocking change-over switch 30, the power controller 150a gives preference to the instruction from the interlocking change-over switch 30 over the instruction from the logic judgment module 15a.

The hot swap controller 17a prevents over current from entering the inside of the disk enclosure 100. The DC/DC regulator 18a compensates for power supply voltage supplied from the device power supply 160. When receiving the power-on or -off command from the power controller 150a, the hot swap controller 17a turns on or off non-resident power (DC) supplied to the disk enclosure 100 in accordance with the command.

The interlocking change-over switch 30 holds information indicating whether turn-on or turn-off of non-resident power (DC) supplied to the storage unit 40 and the boards 10a and 10b is permitted. On the basis of this information, the interlocking change-over switch 30 outputs information indicating that power-on/off is permitted or not permitted to the logic judgment modules 15a and 15b. In addition, when receiving a power-on/off request, the interlocking change-over switch 30 outputs a power-on instruction or a power-off instruction to the power controllers 150a and 150b.

The storage unit 110 corresponds to the storage unit 110 in FIG. 2. The storage unit 110 is driven by non-resident power (DC) supplied from the device power supply 160. The storage unit 110 has a plurality of disks. The storage unit 110 is connected to the boards 10a and 10b, respectively. The boards 10a and 10b are subjected to power supply control.

The device power supply 160 is a unit that supplies non-resident power (DC) to the storage unit 110 and the board 10a in accordance with a control command from the power controller 150a. For example, the device power supply 45 turns on or off the supply of non-resident power to the disks in a first group in the storage unit 110 in accordance with an instruction from the power controller 150a. Furthermore, the device power supply 45 turns on or off the supply of non-resident power to the disks in a second group in the storage unit 110 in accordance with an instruction from the power controller 150b. The device power supply 45 supplies resident power (AC) to the boards 10a and 10b at all times.

Figure 9:
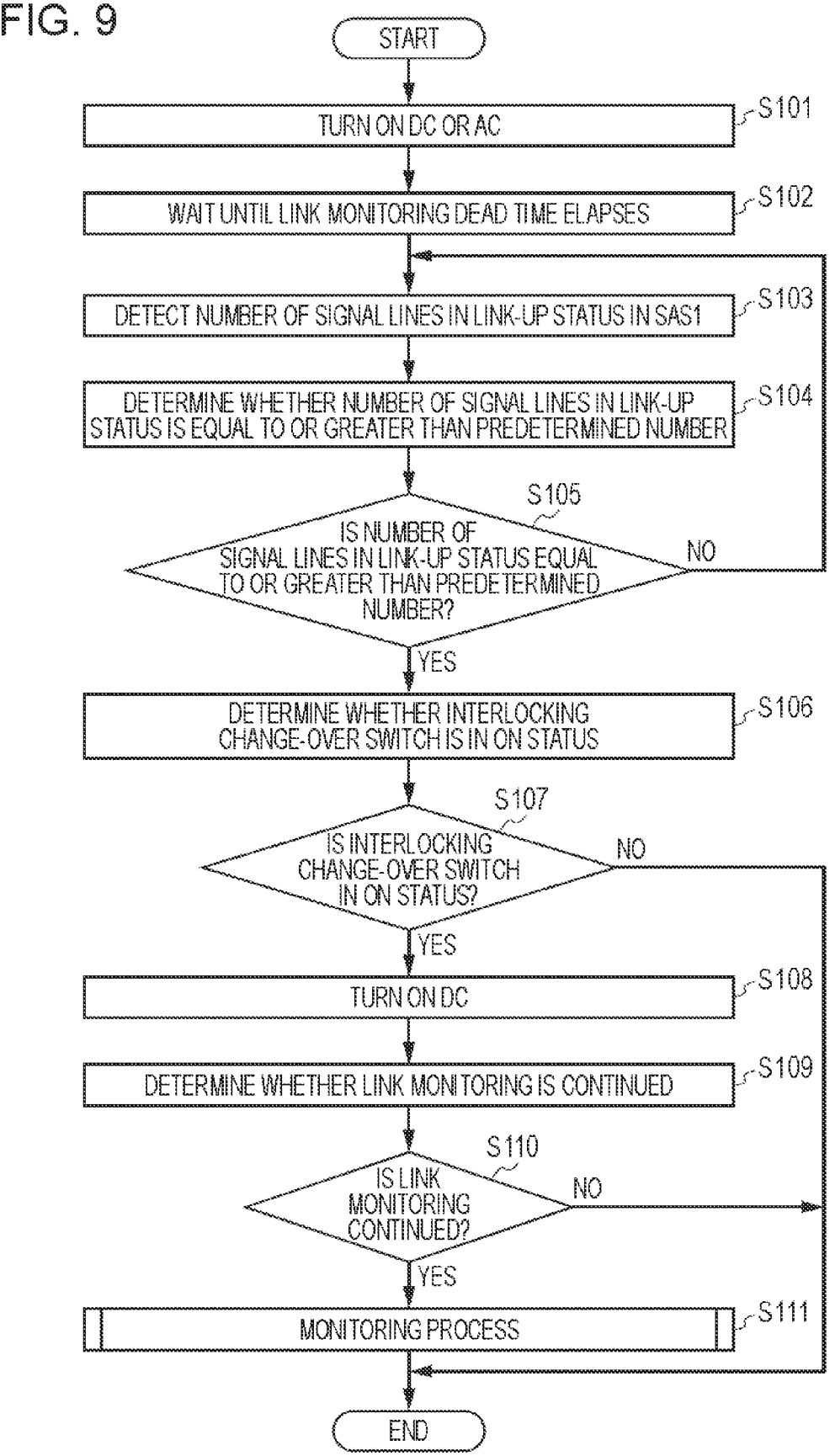
FIG. 9 is a flowchart illustrating a procedure of a process performed by each disk enclosure in the embodiment.

A process performed in the disk enclosure in the present embodiment will now be described. FIG. 9 is a flowchart illustrating the process in the disk enclosure in the present embodiment. Referring to FIG. 9, the device power supply 45 turns off the supply of non-resident power (DC), or turns on the supply of resident power (AC) (step S101). The system control firmware 140 waits until link monitoring dead time elapses (step S102).

The system control firmware 140 detects the number of signal lines in the link-up status in SAS1 (step S103) to determine whether a predetermined number or more signal lines are in the link-up status (step S104). If the detected number of signal lines in the link-up status is less than the predetermined number (NO in step S105), the system control firmware 140 proceeds to step S103.

Whereas, if the detected number of signal lines in the link-up status is equal to or greater than the predetermined number (YES in step S105), the system control firmware 140 determines whether the interlocking change-over switch 130 is in the ON status (step S106). If the interlocking change-over switch 130 is in the OFF status (NO in step S107), the process is terminated.

Whereas, if the interlocking change-over switch 130 is in the ON status (YES in step S107), the power controller 150 turns on the supply of non-resident power (DC) to the storage unit 110 (step S108).

The system control firmware 140 determines whether link monitoring is continued (step S109). If the monitoring is not continued (NO in step S110), the process is terminated. Whereas, if the monitoring is continued (YES in step S110), the system control firmware 140 performs a monitoring process (step S111). The process is then terminated.

Figure 10:
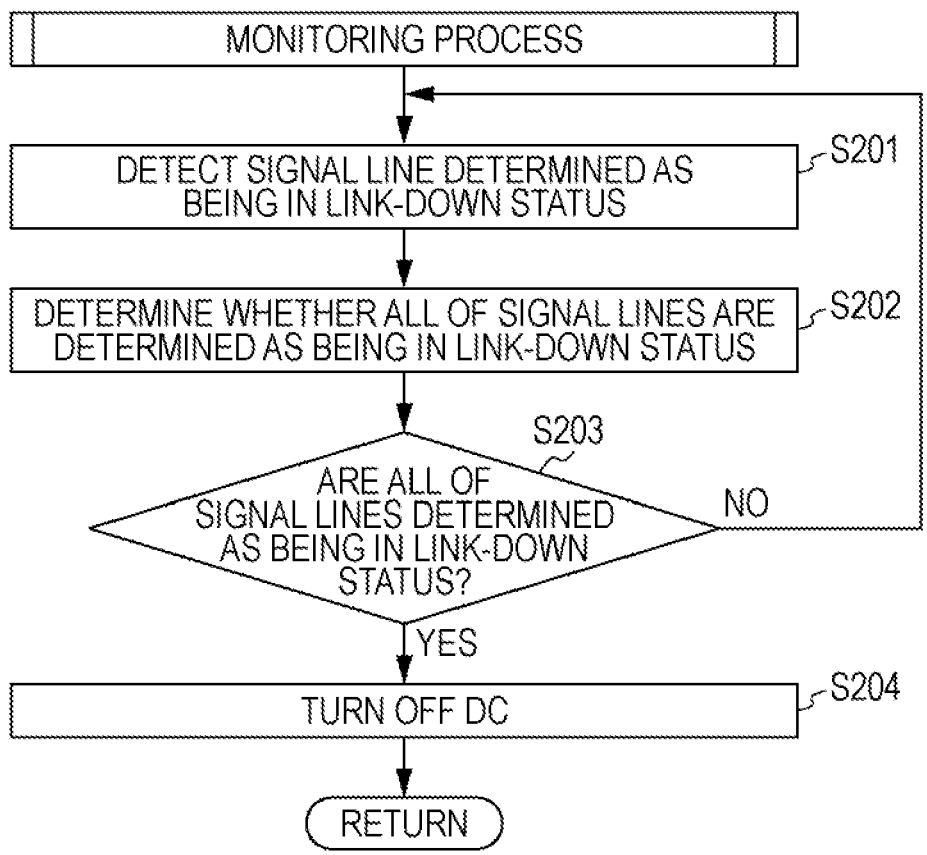
FIG. 10 is a flowchart illustrating a procedure of a monitoring process.

A procedure of the monitoring process in step S111 in FIG. 9 will now be described. FIG. 10 is a flowchart illustrating the procedure of the monitoring process. Referring to FIG. 10, the system control firmware 140 monitors SAS1 and detects a signal line that is determined as being in the link-down status (step S201) to determine whether all of the signal lines are determined as being in the link-down status (step S202).

If all of the signal lines are not determined as being in the link-down status (NO in step S203), the system control firmware 140 proceeds to step S201. Whereas, if all of the signal lines are determined as being in the link-down status (YES in step S203), the power controller 150 turns off the supply of non-resident power (DC) to the storage unit 110 (step S204).

As described above, the storage system according to the present embodiment determines the status of communication between the higher-level apparatus 50 and each of the disk enclosures 100 and 200 and controls power supply to the storage unit in accordance with the result of judgment. Advantageously, the storage system can save power without depending on a mechanism in the storage system or a method of communication in the higher-level apparatus.

Among the processes explained in the present embodiment, all or part of the processes explained as being automatically performed can be manually performed, alternatively, all or part of the processes explained as being manually performed can be automatically performed through a known method. In addition, the processing procedures, controlling procedures, specific names, information including various data and parameters described above or illustrated in the drawings can be arbitrarily changed unless otherwise noted.

The following appendices are further disclosed with respect to embodiments including the above-described embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage apparatus connectable to an external apparatus through a connection line for data communication, comprising:
   a storage for storing data;
   a system controller for controlling data communication with the external apparatus through the connection line to allow the external apparatus to access the storage; and
   a power controller for controlling power supply to the storage, wherein the system controller controls the power controller to initiate supply of a power to the storage after establishing a communication linkage with the external apparatus through the connection line and controls the power controller to stop supply of the power to the storage after the system controller releases the communication linkage,
   wherein the system controller opens a port to connect the external apparatus through the connection line while waiting request of connection from the external apparatus.

2. The storage apparatus of claim 1, wherein the system controller establishes the communication linkage in accordance with a result of communication with the external apparatus.

3. The storage apparatus of claim 1, wherein the system controller controls the power controller to stop supply of the power to the storage after receiving information for permitting to stop supply of the power to the storage from the external apparatus.

4. The storage apparatus of claim 1, wherein the system controller has a plurality of ports and when the system controller establishes the communication linkage with the external apparatus in one of the ports, the system controller opens the other ports.

5. The storage apparatus of claim 4, wherein the system controller controls the power controller to stop supply of a power to the storage after the system controller releases all of communication linkages.

6. The storage apparatus of claim 5, wherein the system controller controls the power controller to stop supply of the power to the storage after receiving information for permitting to stop supply of the power to the storage from the external apparatus.

7. A control method of controlling a storage apparatus connectable to an external apparatus through a connection line for data communication, comprising:
    controlling data communication with the external apparatus through the connection line to allow the external apparatus to access a storage for storing data;
    initiating, by a computer processor, supply of a power to the storage after establishing a communication linkage with the external apparatus through the connection line;
    controlling to stop supply of the power to the storage after releasing the communication linkage; and
    opening a port to connect the external apparatus through the connection line while waiting request of connection from the external apparatus.

8. The control method of claim 7, which comprises establishing the communication linkage in accordance with a result of communication with the external apparatus.

* * * * *